United States Patent
Maiville et al.

(12) 
(10) Patent No.: US 6,899,315 B2
(45) Date of Patent: May 31, 2005

(54) FLUID SAMPLING VALVE

(75) Inventors: Randolph L. Maiville, Onondaga, MI (US); William T. Flynn, Horton, MI (US)

(73) Assignee: Eaton Corporation, Cleveland, OH (US)

( * ) Notice: Subject to any disclaimer, the term of this patent is extended or adjusted under 35 U.S.C. 154(b) by 88 days.

(21) Appl. No.: 10/200,675

(22) Filed: Jul. 22, 2002

(65) Prior Publication Data

US 2004/0011983 A1 Jan. 22, 2004

(51) Int. Cl.[7] .......................... F16K 51/00; F16L 29/00; F16L 37/28
(52) U.S. Cl. ............... 251/149.4; 251/149.6; 251/353; 251/354; 73/863.84
(58) Field of Search ............ 251/149.6, 149.4, 251/349, 350, 352, 353, 354; 73/863.84, 863.85, 863.86, 864.35, 864.34

(56) References Cited

U.S. PATENT DOCUMENTS 5,676,405 A * 10/1997 Reed .......................... 285/315
6,089,541 A * 7/2000 Weinheimer et al. ..... 251/149.6

* cited by examiner

*Primary Examiner*—Edward K. Look
*Assistant Examiner*—John K. Fristoe, Jr.
(74) *Attorney, Agent, or Firm*—Honigman Miller Schwartz and Cohn, LLP

(57) ABSTRACT

A valve for connecting a fluid sampling device to a fluid source is provided that includes a body adapted to be secured to the fluid source and a valve member moveably disposed within the body. The body includes a coupling interface configured to sealingly mate with the sampling device. The valve member is actuated by the sampling device during attachment of the sampling device to the valve body. The sampling device actuated valve member is moveable between a first position in which a flow path between the fluid source and the sampling device is closed and a second position in which the flow path between the fluid source and the sampling device is open. When the fluid flow path is open, the sampling device can withdraw a fluid sample for inspection and return the fluid sample to the fluid source without exposing the fluid to the surrounding environment.

24 Claims, 7 Drawing Sheets

FLUID SAMPLING VALVE

FIELD OF THE INVENTION

The present invention relates generally to a fluid sampling valve and more particularly to a fluid sampling valve suitable for use with a fluid sampling device, such as a syringe, to sample fluid from a fluid source.

BACKGROUND OF THE INVENTION

In many situations, it may be desirable to sample fluid from a fluid source without exposing the fluid to the surrounding environment. For example, during pre-flight inspections of their aircraft, pilots are required to visually inspect the fuel within the fuel system for the correct octane rating and for the presence of water and other visual contamination. Aircraft manufacturers typically install fuel drain valves at appropriate locations within an aircraft's fuel system. These drain valves are generally located on the bottom side of the aircraft's wings, fuselage and fuel filter, particularly at the lowest point within these locations.

Known drain valves require a cup or bottle to catch the fuel flowing from the valve's drain port, which exposes the pilot and surrounding environment to both liquid fuel and fuel vapor. Known drain valves also require the sampled fuel to be disposed of onto the tarmac or manually recycled back into the fuel tank through the fuel tank inlet. None of these drain valves permit the fuel to be returned to its source back through the drain valve. Moreover, none of these drain valves permit back flow to flush debris or contaminants trapped within the valve. Typically, the only way to clear debris from within the drain valve is to continue taking additional fluid samples and/or completely remove the drain valve from the aircraft and then clean.

SUMMARY OF THE INVENTION

A valve for connecting a fluid sampling device to a fluid source is provided that includes a body adapted to be secured to the fluid source and a valve member moveably disposed within the body. In an embodiment of the present invention, the body includes a coupling interface configured to sealingly mate with the fluid sampling device. The valve member is actuated by the fluid sampling device during attachment of the fluid sampling device to the valve body. The fluid sampling device actuated valve member is moveable between a first position in which a flow path between the fluid source and the fluid sampling device is closed and a second position in which the flow path between the fluid source and the fluid sampling device is open. When the fluid flow path is open, the fluid sampling device can withdraw a fluid sample for inspection and return the fluid sample to the fluid source without exposing the fluid to the surrounding environment.

DESCRIPTION OF THE PREFERRED EMBODIMENT

Figure 1:
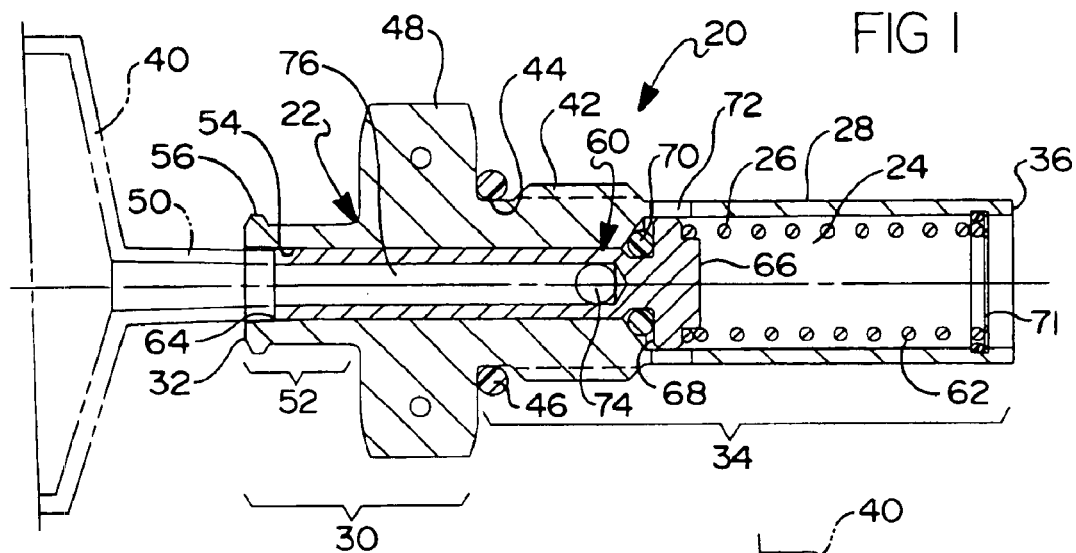
FIG. 1 is a cross-sectional view of a fluid sampling valve according to an embodiment of the present invention shown prior to connection with a fluid sampling device.

Referring now to the drawings, the preferred embodiments of the present invention are described in detail. Referring to FIG. 1, a fluid sampling valve 20 is provided that includes a generally cylindrically-shaped metal body 22 having a central longitudinal channel 24 and inner and outer surfaces 26 and 28, respectively. Body 22 further includes an external segment 30 having an external end 32 and an internal segment 34 having an internal end 36. Central longitudinal channel 24 of body 22 extends from external end 32 to internal end 36. Internal segment 34 is configured for receipt within a port of a fluid source (none shown), such as an aircraft fuel tank. The inner surface of the port preferably includes a means for securing valve 20 to the fluid source, such as an industry standard threaded surface. When securely and sealingly retained within the port of the fluid source, valve 20 may be engaged by a fluid sampling device 40, as will be described in further detail below, to remove a fluid sample from the fluid source.

Outer surface 28 of internal segment 34 includes a means of securing valve 20 to the fluid source. In the embodiment shown in FIG. 1, valve 20 includes an industry standard threaded surface 42 that engages corresponding threads on the inner diameter of the port. An annular groove or recess 44 is preferably positioned proximate threaded surface 42 and is sized to receive a sealing member 46, such as an o-ring. Sealing member 46 engages a chamfered surface at the mouth of the port to create a seal between the port and valve 20. A wrench engaging structure 48 extends radially outward from outer surface 28 to facilitate tightening of valve 20 within the port. It will be appreciated that the means of sealingly securing valve 20 to fluid source is not limited to threaded surface 42 and sealing member 46, and may include other suitable fastening means, including, but not limited to, a press-fit type connection and the like.

Figure 2:
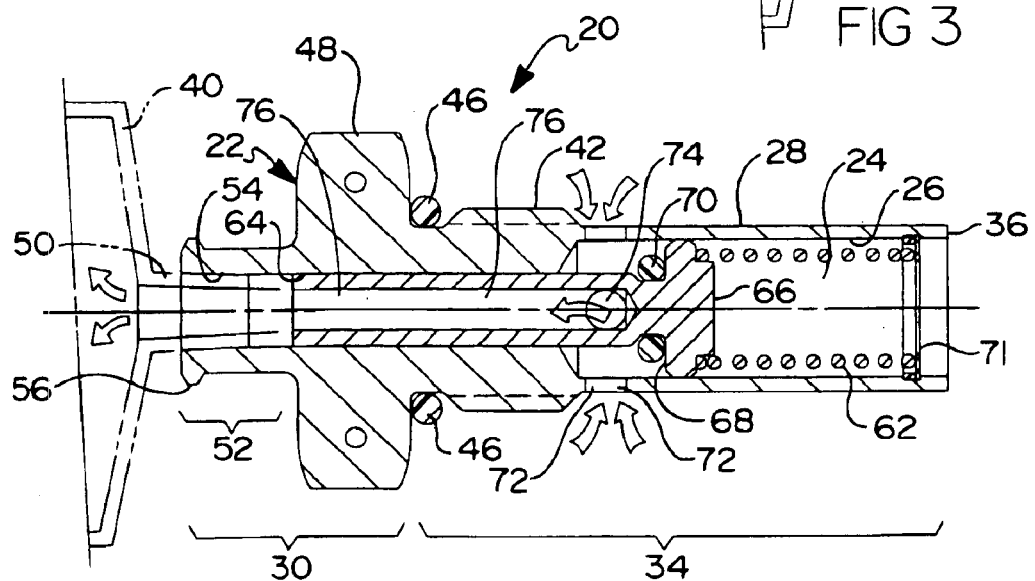
FIG. 2 is the valve of FIG. 1 shown after connection with the fluid sampling device.

In the embodiment illustrated in FIGS. 1 and 2, fluid sampling device 40 is a plastic syringe that includes an industry standard luer tip 50. The syringe preferably includes an optically clear body that forms a reservoir as a plunger is withdrawn from the body. The expanding reservoir draws fluid into the syringe, which can then be visually examined. It will be appreciated that the fluid sampling device is not limited to a syringe and that other devices capable of withdrawing a fluid sample are within the scope of this invention.

To connect valve 20 to fluid sampling device 40, external segment 30 is provided with a coupling interface configured to sealingly mate with fluid sampling device 40. In the embodiment shown in FIGS. 1 and 2, the coupling interface includes a luer adapter 52, such as a luer adapter conforming to ISO 594-2, the contents of which are hereby incorporated by reference. Luer adapter 52 includes an inwardly tapered surface 54 that extends from external end 32 toward internal end 36. Optionally, luer adapter 52 may include an external locking luer interface having an external threaded surface 56.

Moveably disposed within longitudinal channel 24 of valve 20 is a valve member 60 and a resiliently compressible member 62, such as a compression spring. Valve member 60 is generally cylindrical and extends from a first end 64 facing fluid sampling device 40 to a second end 66. Valve member 60 supports thereon an annular sealing member 70, such as an o-ring, and also includes a shoulder 68 against which annular sealing member 70 is axially supported. Compressible member 62 is retained within longitudinal channel 24 by a retaining ring 71, which is pressed into inner surface 26 or otherwise secured to body 22 proximate internal end 36. Alternatively, internal end 36 may be formed inward toward longitudinal channel 24 to create a lip against which retaining ring 71 or compressible member 62 itself is supported.

In a first or "closed" position, the biasing force of compressible member 62 forces shoulder 68 to press sealing member 70 against body 22 to prevent fluid flow through valve 20. However, when tip 50 of fluid sampling device 40 is inserted into valve 20, as shown in FIG. 2, valve member 60 is engaged by tip 50 and forced to move axially within body 22 toward a second or "open" position. Once sealing member 70 is unseated from body 22, a fluid flow path is opened through valve 20, which allows fluid to be drawn into fluid sampling device 40. In the embodiment shown in FIGS. 1 and 2, the fluid flow path is defined by at least one hole 72 in internal segment 34 between outer surface 28 and longitudinal channel 24. The fluid flow path is also defined by an aperture 74 in valve member 60 that allows communication between longitudinal channel 24 and a duct 76 in valve member 60. Once opened, the fluid flow path permits unobstructed fluid flow from outer surface 28 of body 22 to the tip of fluid sampling device 40.

Referring still to FIGS. 1 and 2 a method of withdrawing a fluid sample from a fluid source using fluid sampling device 40 in cooperation with valve 20 will be described in detail. To withdraw a fluid sample, luer tip 50 of fluid sampling device 40 is inserted into luer adapter 52. As luer tip 50 of fluid sampling device 40 is pressed against the tapered wall of luer adapter 52, a seal is formed therebetween that inhibits liquid and vapor from escaping from the connection during the sampling operation. Virtually simultaneously, luer tip 50 engages first end 64 of valve member 60, forcing it to travel axially toward the second position and unseat sealing member 70 from body 22. As valve member 60 moves to the second position, shown in FIG. 2, the fluid flow path is opened between the fluid source and luer tip 50.

When fluid sampling device 40 functions as a syringe, the plunger (not shown) is pulled from fluid sampling device 40 to draw the fluid sample into the expanding reservoir. Fluid sampling device 40 preferably includes a travel limit stop (not shown) that prevents the plunger from being completely withdrawn. Because fluid sampling device 40 is optically clear, the fluid sample may be visually inspected. As will be appreciated, when valve 20 is used to sample fluid in an aircraft fuel tank, the sampled fluid may be inspected for the correct color (octane check) and to verify the absence of water and other contaminants without disconnecting fluid sampling device 40 from valve 20 or exposing the sampled fluid to the surrounding environment.

Once inspected, the fluid sample may be returned to the fluid source by pushing the plunger back into fluid sampling device 40. As fluid sampling device 40 is removed from valve 20, compressible member 62 forces valve member 60 to move toward the first position causing sealing member 70 to reseat against body 22. During withdrawal of luer tip 50 from luer adapter 52, only a small amount of fluid is lost prior to sealing member 70 reseating against body 22.

As will also be appreciated, valve 20 may be used to sample any fluid source, not just an aircraft fuel tank as recited above. However, in the context of sampling aircraft fuel during a pre-flight inspection, if water is visibly present in the fluid sample, valve 20 permits the water to be separated from the fuel. Because water has a greater specific gravity then fuel, water settles to the bottom of the reservoir in fluid sampling device 40 leaving the fuel at the top. The fuel can easily be returned to the fuel source by selectively pushing the plunger into fluid sampling device 40 a distance sufficient to return the fuel to the fuel tank, but not so far as to return the water.

Figure 3:
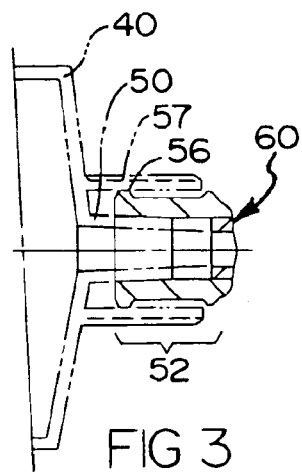
FIG. 3 is an enlarged view of the interface between the valve and the fluid sampling device showing an optional external luer locking fitting.

Referring to FIG. 3, fluid sampling device 40 may optionally include an internally threaded collar 57. When threaded collar 57 is employed, fluid sampling device 40 must be rotated onto valve 20 during attachment such that the internal threads on collar 57 engage the external threads 56 on luer adapter 52. This action locks and seals luer tip 50 into luer adapter 52 and opens the fluid flow path by actuating valve member 60. To disengage fluid sampling device 40 from valve 20, fluid sampling device 40 is rotated in a direction opposite that needed to attach fluid sampling device 40 to valve 20. As luer tip 50 is removed from luer adapter 52, compressible member 62 reseats sealing member 70 against body 22. Once sealing member 70 is reseated, closing off the fluid flow to luer tip 50, luer tip 50 is disengaged from its radial seal against luer adapter 52. The sequential operation of reseating sealing member 70 and then removing luer tip 50 substantially eliminates spraying of the fluid, and reduces fluid spillage.

Figure 4:
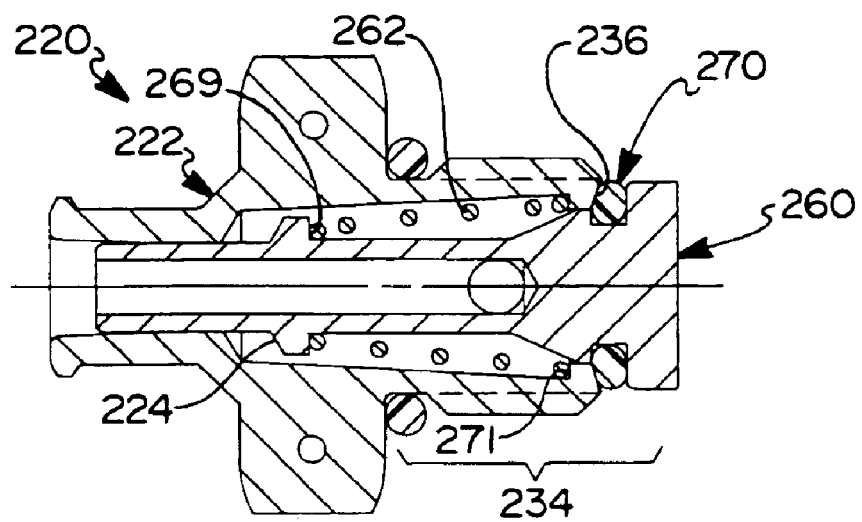
FIG. 4 is a cross-sectional view of a fluid sampling valve according to another embodiment of the present invention shown prior to connection with a fluid sampling device.
Figure 5:
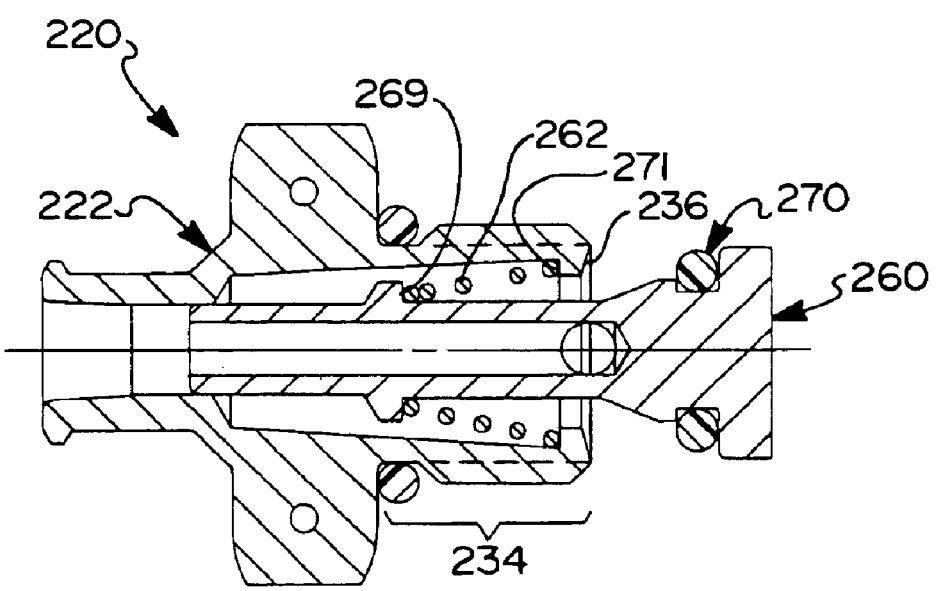
FIG. 5 is the valve of FIG. 4 shown after connection with the fluid sampling device.

Another embodiment of the present invention is shown in FIGS. 4 and 5. In this embodiment, a valve 220 is provided that is substantially similar to valve 20, except that internal segment 234 of valve 220 is shorter in length. In a first or "closed" position, sealing member 270 on valve member 260 engages an internal end 236 of body 222. A compressible member 262 is disposed within longitudinal channel 224 between a shoulder 269 on valve member 260 and a shoulder 271 on internal segment 234. The method of operating valve 220 is substantially the same as described above with respect to valve 20.

Figure 6:
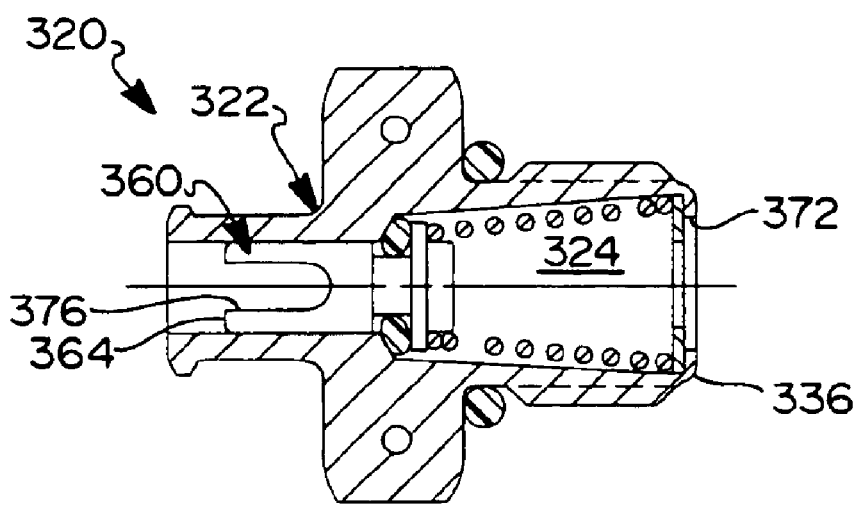
FIG. 6 is a partial cross-sectional view of a fluid sampling valve according to another embodiment of the present invention shown prior to connection with a fluid sampling device.
Figure 7:
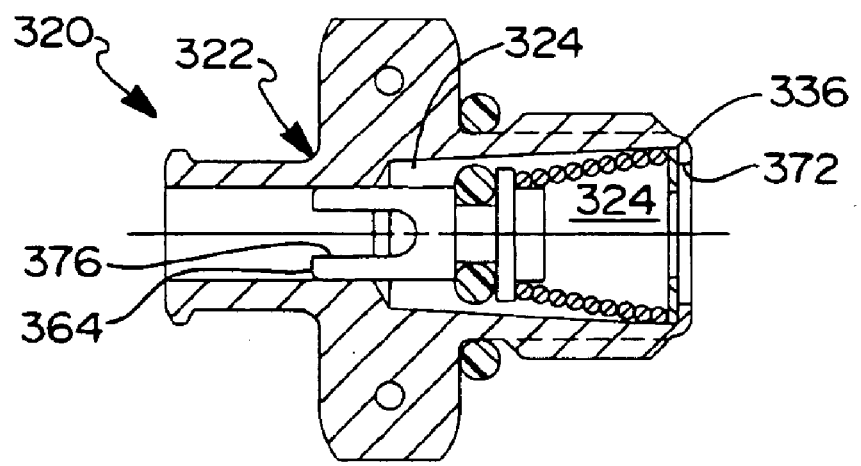
FIG. 7 is the valve of FIG. 6 shown after connection with the fluid sampling device.

Another embodiment of the present invention is shown in FIGS. 6 and 7. In this embodiment, a valve 320 is provided that is substantially similar to valve 220, except that valve member 360 is shorter in length than valve member 260 and does not extend outwardly from body 322 when moved to the second or "open" position. Also, unlike valve member 260, a first end 364 of valve member 360 is not cylindrical; rather, it is substantially rectangular when viewed in cross-section. Valve member 360 also includes a groove 376 that extends inward from first end 364. When valve member 360 is moved to the second position, as shown in FIG. 7, groove 376 is placed in communication with longitudinal channel 324, which is open to the fluid source via a hole 372 in internal end 336 of body 322. The method of operating valve 320 is substantially the same as described above with respect to valve 20.

Figure 8:
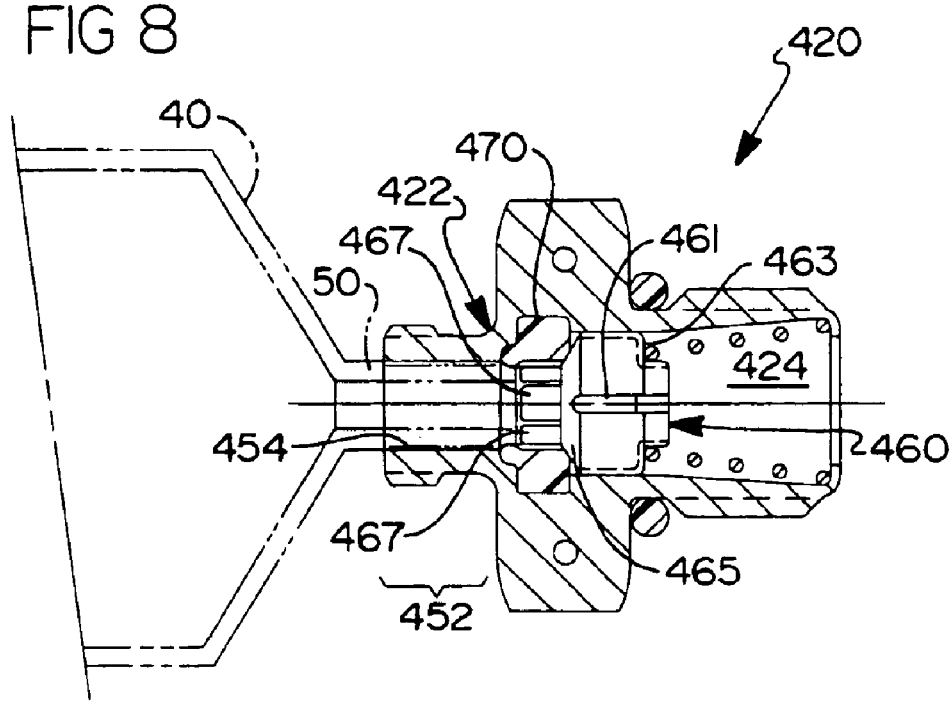
FIG. 8 is a partial cross-sectional view of a fluid sampling valve according to another embodiment of the present invention shown prior to connection with a fluid sampling device.
Figure 9:
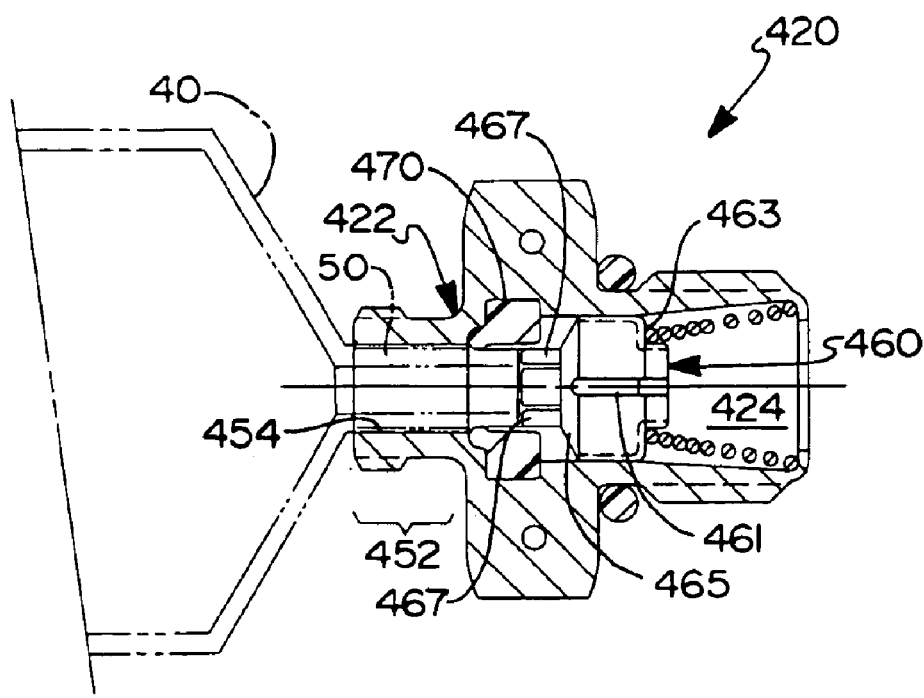
FIG. 9 is the valve of FIG. 8 shown after connection with the fluid sampling device.

Another embodiment of the present invention is shown in FIGS. 8 and 9. In this embodiment, a valve 420 is provided that is substantially similar to valve 320, except that sealing member 470 is secured within longitudinal channel 424 of body 422, rather than being supported on valve member 420. Sealing member 470 also includes a substantially rectangular primary sealing portion and a substantially cylindrical secondary sealing portion integrally formed therewith, although the general shape of each sealing portion is not limited to that described. Sealing member 470 has at least two functions: (1) it is the main seal for valve member 470; and (2) it functions as a seal for tip 50 of fluid sampling device 40.

Another distinguishing characteristic of valve 420 is how the fluid flow path is defined. In this embodiment, valve member 460 includes at least one groove 461 that extends axially along its periphery from a shoulder 463 into a tapered surface 465. Valve 460 also includes at least two spaced apart engagement protrusions 467 that extend axially away from tapered surface 465.

When tip 50 of fluid sampling device 40 is inserted into valve 420, tip 50 first seals against sealing member 470 then engages protrusions 467 to move valve member 460 axially toward the second or "open" position. When the fluid flow path is open, fluid flows through groove 461, between protrusions 467 and into tip 50 of fluid sampling device 40. When fluid sampling device 40 is removed from valve 20, tapered surface 465 first sealingly engages sealing member 470, closing off the fluid flow to tip 50, then tip 50 is subsequently disengaged from its radial seal against sealing member 470. The sequential operation of reseating sealing member 470 and then removing tip 50 from valve 420 substantially eliminates spraying of the fluid, and reduces fluid spillage.

Another feature of this embodiment is that, should sealing member 470 fail, tapered surface 465 of valve member 460 will seal directly against body 422 and luer tip 50 will seal directly against internal surface 454 of luer adapted 452. As with each embodiment of the present invention described herein, the sampling valve may also feature an over-travel limiter (not shown), which protects the valve member and compressible member from damage caused by misuse.

Figure 10:
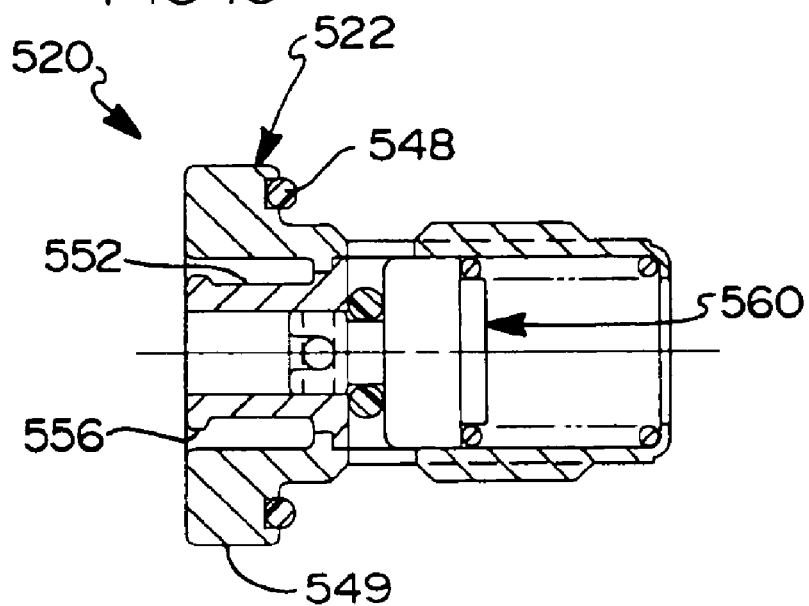
FIG. 10 is a partial cross-sectional view of a fluid sampling valve according to another embodiment of the present invention shown prior to connection with a fluid sampling device.
Figure 11:
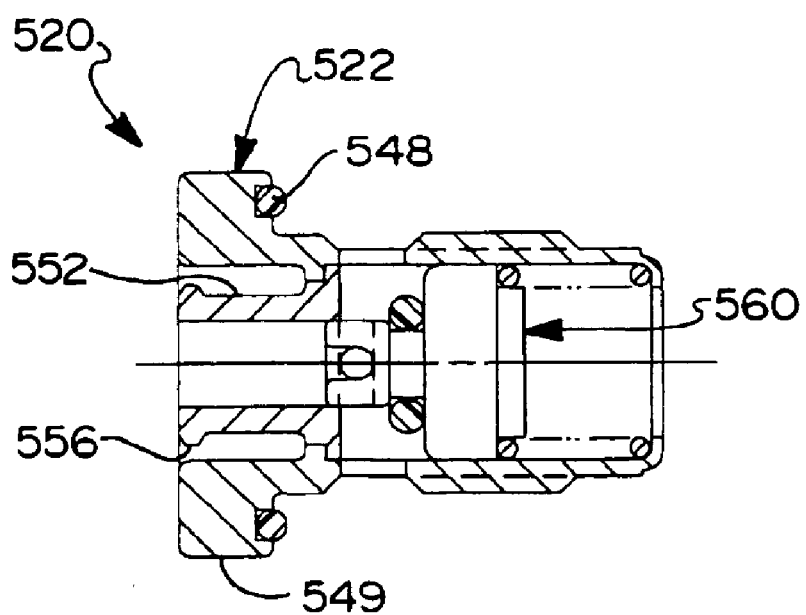
FIG. 11 is the valve of FIG. 10 shown after connection with the fluid sampling device.

Another embodiment of the present invention is shown in FIGS. 10 and 11. In this embodiment, a valve 520 is provided that includes a body 522 and a valve member 560 moveably disposed within body 522. Unlike the embodiments described above, luer adapter 552 is recessed into external segment 530 relative to wrench engaging structure 548, instead of protruding outwardly therefrom. Recessing luer adapter 552 within external segment 530 protects luer adapter 552 from damage and shortens the overall package of valve 520. However, like the embodiments described above, luer adapter 552 may optionally include an external locking luer interface having an external threaded surface 556. A sealing member 548 is at least partially recessed into wrench engaging structure 548 to seal against the fluid source when valve 520 is attached. The method of operating valve 220 is substantially the same as described above with respect to valve 20.

Figure 12:
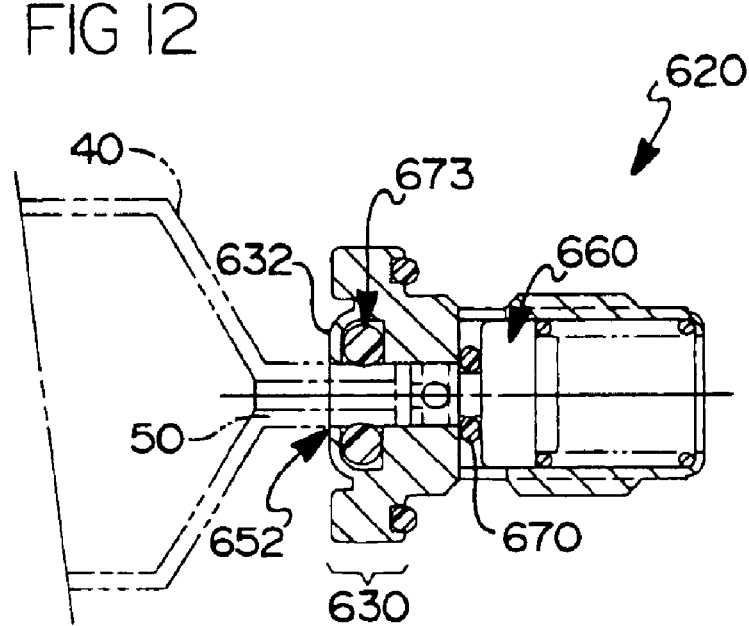
FIG. 12 is a partial cross-sectional view of a fluid sampling valve according to another embodiment of the present invention shown prior to connection with a fluid sampling device.
Figure 13:
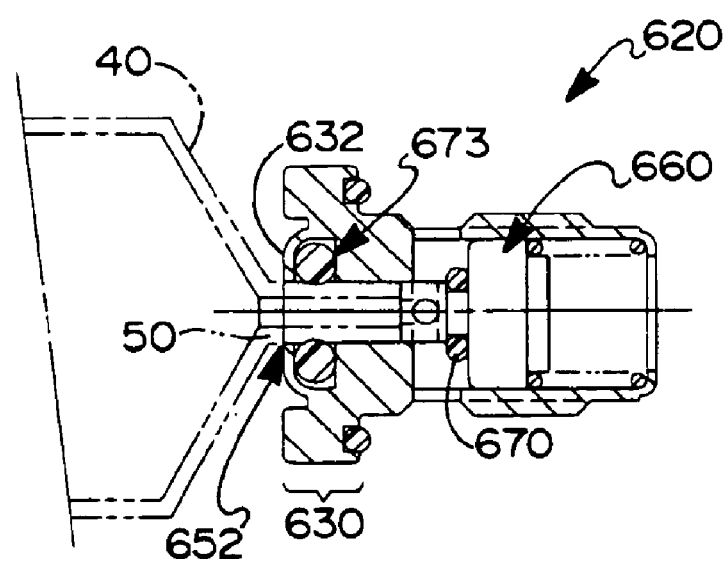
FIG. 13 is the valve of FIG. 12 shown after connection with the fluid sampling device.

Another embodiment of the present invention is shown in FIGS. 12 and 13. In this embodiment, a valve 620 is provided that is substantially similar to valve 520 with at least one exception, namely, the interface between valve 620 and fluid sampling device 40. In this embodiment, luer adapter 652 is a tapered duct that extends inward from external end 632 of external segment 630. Within the duct is positioned an annular groove that receives an annular sealing member 673, such as an o-ring. When tip 50 of fluid sampling device 40 is inserted into valve 620, luer tip 50 first seals against sealing member 673 then engages and moves valve member 660 toward the second or "open" position, as shown in FIG. 13. When fluid sampling device 40 is removed from valve 620, sealing member 670 is first reseated, closing off the fluid flow to luer tip 50, then luer tip 50 is disengaged from its radial seal against sealing member 673. The sequential operation of reseating sealing member 670 and then unseating luer tip 50 from sealing member 673 substantially eliminates spraying of the fluid, and reduces fluid spillage.

Figure 14:
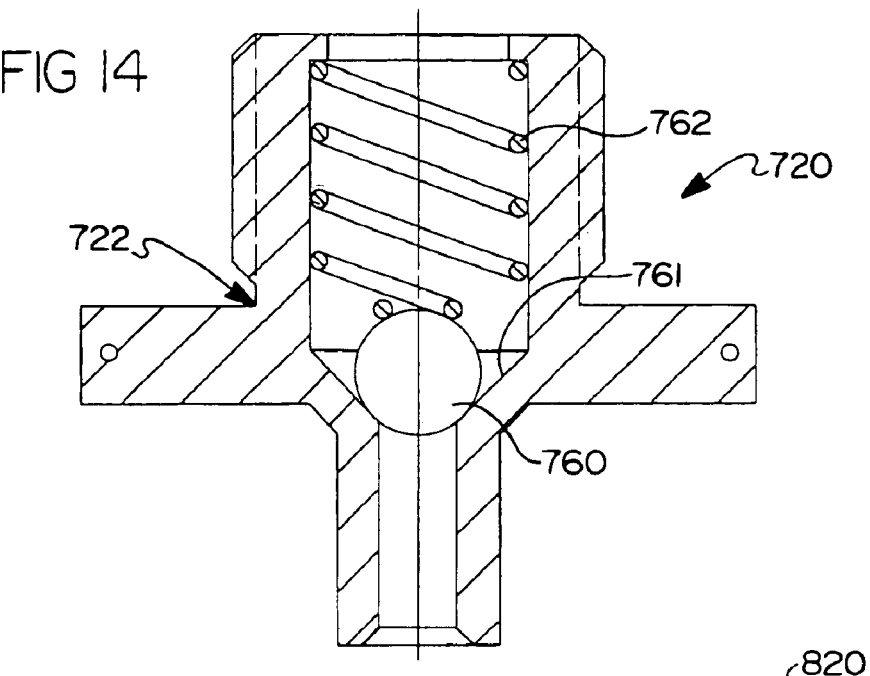
FIG. 14 is a partial cross-sectional view of a fluid sampling valve according to another embodiment of the present invention shown prior to connection with a fluid sampling device.

Another embodiment of the present invention is shown in FIG. 14. In this embodiment, a valve 720 is provided that includes a body 722 and a valve member 760 moveably disposed within body 722. Valve member 760, which is substantially spherical, is biased against body 722 by a resiliently compressible member 762 to seal the flow path through valve 720. When tip 50 of fluid sampling device 40 is inserted into valve 720, valve member 760 is unseated from a conical surface 761 within body 722 to open the fluid flow path through valve 720. In this embodiment, tip 50 of fluid sampling device 40 is provided with at least one notch or hole so that fluid may be received within fluid sampling device 40 when tip 50 is engaged with valve member 760.

Figure 15:
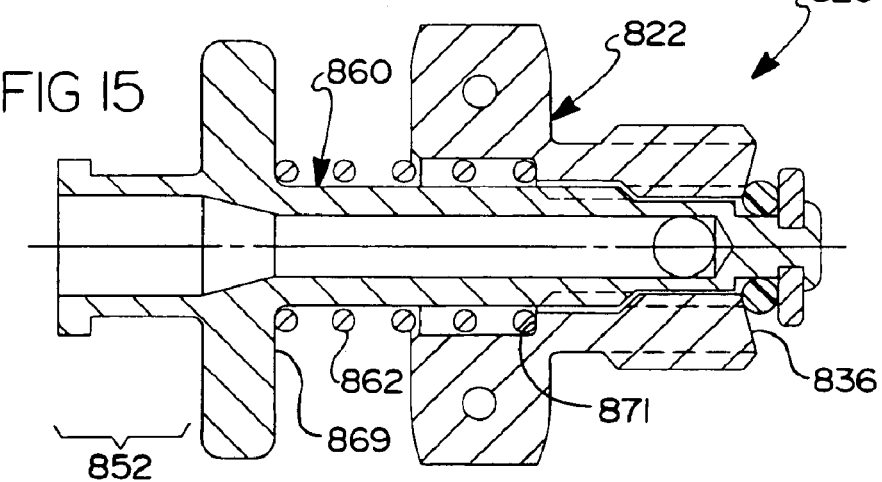
FIG. 15 is a cross-sectional view of a fluid sampling valve according to another embodiment of the present invention shown prior to connection with a fluid sampling device.

Another embodiment of the present invention is shown in FIG. 15. In this embodiment, a valve 820 is provided that includes a body 822 and a valve member 860 moveably disposed within body 822. Unlike the embodiments described above, luer adapter 852 is a part of valve member 860 instead of body 822. Valve member 860 is biased into the first or "closed" position, shown in FIG. 15, by a resiliently compressible member 862. Compressible member 862 is disposed between a shoulder 869 on valve member 860 and a shoulder 871 in body 822.

Figure 16:
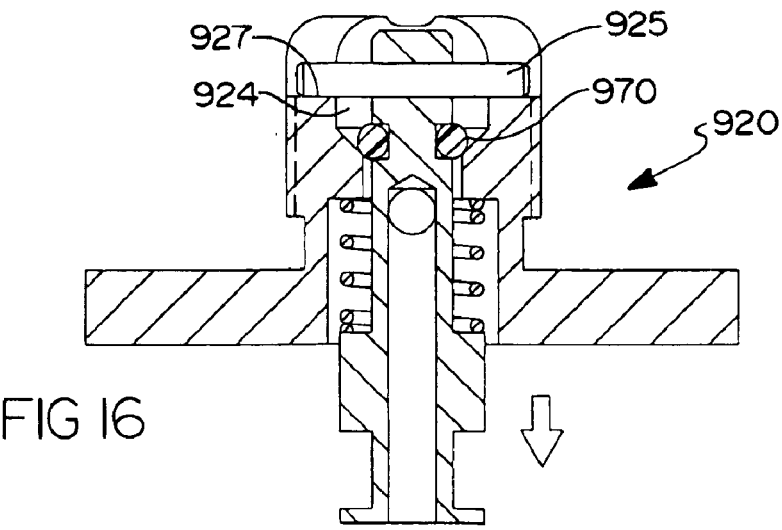
FIG. 16 is a partial cross-sectional view of a fluid sampling valve according to another embodiment of the present invention shown prior to connection with a fluid sampling device.

Another embodiment of the present invention is shown in FIG. 16. In this embodiment, a valve 920 is provided that is substantially similar to valve 820 with at least one exception, namely, sealing member 970 seals against an portion of body 922 with longitudinal channel 924, instead of against internal end 836 of body 822, as shown in FIG. 15. In this embodiment, the compression of sealing member 970 against body 922 is limited by an elongated dowel 925. Dowel 925 is received through valve member 960 and engages a surface 927 in body 922 to prevent further movement of valve member 960 in the direction indicated by the arrow in FIG. 16.

It will be appreciated that the valve of the present invention is particularly useful for sampling fluid from a closed fluid source. Among other features, the valve permits: (1) the withdrawal and visual inspection of a fluid sample from any low pressure fluid source with little or no exposure of the sampled fluid to the surrounding environment; (2) the direct return of the fluid sample to the fluid source; (3) the separation of water or other contamination from the fluid sample; and (4) the ability to back flush small particle size debris and/or contaminants from the valve using the sampled fluid without removing the valve from the fluid source.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A valve for connecting a fluid sampling device to a fluid source, comprising:
    a body adapted to be secured to the fluid source, the body including a longitudinal channel having a sealing portion tapering radially inwardly and away from a distal end of the body and a coupling interface configured to sealingly mate with the fluid sampling device, the coupling interface including the sealing portion of the longitudinal channel; and
    a fluid sampling device actuated valve member movable between a first position in which a flow path between the fluid source and the fluid sampling device is closed and a second position in which the flow path between the fluid source and the fluid sampling device is open.

2. The valve of claim 1, wherein the coupling interface is a luer fitting.

3. The valve of claim 1, wherein the coupling interface includes an externally threaded surface.

4. The valve of claim 1, wherein the coupling interface includes an internally tapered surface.

5. The valve of claim 1, wherein the sampling device includes a luer tip.

6. The valve of claim 5, wherein the valve member is positioned to be actuated toward the second position by the luer tip.

7. The valve of claim 1, wherein the valve member is configured to permit sampled fluid to be returned to the fluid source while the fluid sampling device is attached to the valve.

8. The valve of claim 1, wherein the valve member includes a sealing member for sealing against the body to close the flow path when the valve member is in the first position.

9. The valve of claim 1, wherein the body includes a sealing member for sealing against at least one of the fluid sampling device and the valve member.

10. The valve of claim 1, wherein the valve member is biased into the first position by a resiliently compressible member.

11. The valve of claim 1, wherein the longitudinal channel includes a sealing member that seals against the fluid sampling device.

12. A system for sampling fluid in a fluid source, comprising:
    a fluid sampling device; and
    a valve, the valve including a body adapted to be secured to the fluid source and a fluid sampling device actuated valve member movable between a first position in which a flow path between the fluid source and the fluid sampling device is closed and a second position in which the flow path between the fluid source and the fluid sampling device is open, wherein one of the body and the valve member includes a coupling interface configured to sealingly mate with the fluid sampling device, and wherein the coupling interface includes a longitudinal channel having a sealing portion tapering radially inwardly and away from a distal end of the body that is adapted to sealingly engage the fluid sampling device or a valve member duct of fixed diameter that is adapted to sealingly engage the fluid sampling device.

13. The system of claim 12, wherein the coupling interface is a luer fitting.

14. The system of claim 12, wherein the coupling interface includes an externally threaded surface.

15. The system of claim 12, wherein the coupling interface includes an internally tapered surface.

16. The system of claim 12, wherein the fluid sampling device includes a luer tip.

17. The system of claim 16, wherein the valve member is positioned to be actuated toward the second position by the luer tip.

18. The system of claim 12, wherein the valve member includes a sealing member for sealing against the body to close the flow path when the valve member is in the first position.

19. The system of claim 12, wherein the body includes a sealing member for sealing against at least one of the fluid sampling device and the valve member.

20. A method of sampling fluid in a fluid source comprising the steps of:
    providing a fluid sampling device and a valve secured to the fluid source, the valve including a body and a fluid sampling device actuated valve member movable between a first position in which a flow path between the fluid source and the fluid sampling device is closed and a second position in which the flow path between the fluid source and the fluid sampling device is open, wherein one of the body and the valve member includes a coupling interface configured to sealingly mate with the fluid sampling device, and wherein the coupling interface includes a longitudinal channel having a sealing portion tapering radially inwardly and away from a distal end of the body that is adapted to sealingly engage the fluid sampling device or a valve member duct of fixed diameter that is adapted to sealingly engage the fluid sampling device;
    simultaneously connecting the sampling device to the valve and actuating the valve toward the second position; and
    drawing the fluid into the fluid sampling device through the flow path.

21. A valve for connecting a fluid sampling device to a fluid source, comprising:
    a body adapted to be secured to the fluid source, the body including a longitudinal channel and a coupling interface configured to sealingly mate with the fluid sampling device, the coupling interface including at least a portion of the longitudinal channel adapted to sealingly engage the fluid sampling device; and a fluid sampling device actuated valve member movable between a first position in which a flow path between the fluid source and the fluid sampling device is closed and a second position in which the flow path between the fluid source and the fluid sampling device is open, the valve member including a sealing member for sealing against the body to close the flow path when the valve member is in the first position.

22. A valve for connecting a fluid sampling device to a fluid source, comprising:

a body adapted to be secured to the fluid source, the body including a longitudinal channel and a coupling interface configured to sealingly mate with the fluid sampling device, the coupling interface including at least a portion of the longitudinal channel adapted to sealingly engage the fluid sampling device; and a fluid sampling device actuated valve member movable between a first position in which a flow path between the fluid source and the fluid sampling device is closed and a second position in which the flow path between the fluid source and the fluid sampling device is open, the body including a sealing member for sealing against at least one of the fluid sampling device and the valve member.

23. A system for sampling fluid in a fluid source, comprising:

a fluid sampling device; and a valve, the valve including a body adapted to be secured to the fluid source and a fluid sampling device actuated valve member movable between a first position in which a flow path between the fluid source and the fluid sampling device is closed and a second position in which the flow path between the fluid source and the fluid sampling device is open, the valve member including a sealing member for sealing against the body to close the flow path when the valve member is in the first position, and wherein one of the body and the valve member includes a coupling interface configured to sealingly mate with the fluid sampling device, the coupling interface including a longitudinal channel of the body that is adapted to sealingly engage the fluid sampling device or a valve member duct of fixed diameter that is adapted to sealingly engage the fluid sampling device.

24. A system for sampling fluid in a fluid source, comprising:

a fluid sampling device; and a valve, the valve including a body adapted to be secured to the fluid source and a fluid sampling device actuated valve member movable between a first position in which a flow path between the fluid source and the fluid sampling device is closed and a second position in which the flow path between the fluid source and the fluid sampling device is open, the body including a sealing member for sealing against at least one of the fluid sampling device and the valve member, and wherein one of the body and the valve member includes a coupling interface configured to sealingly mate with the fluid sampling device, the coupling interface including a longitudinal channel of the body that is adapted to sealingly engage the fluid sampling device or a valve member duct of fixed diameter that is adapted to sealingly engage the fluid sampling device.

* * * * *